United States Patent
Chng

[19]

[11] Patent Number: 6,122,282
[45] Date of Patent: Sep. 19, 2000

[54] ROUTE FINDING IN COMMUNICATION NETWORKS

[75] Inventor: Raymond Soo Khiaw Chng, Singapore, Singapore

[73] Assignee: British Telecommunications, London, United Kingdom

[21] Appl. No.: 09/011,003

[22] PCT Filed: Aug. 6, 1996

[86] PCT No.: PCT/GB96/01914

§ 371 Date: Feb. 5, 1998

§ 102(e) Date: Feb. 5, 1998

[87] PCT Pub. No.: WO97/06645

PCT Pub. Date: Feb. 20, 1997

[30] Foreign Application Priority Data

Aug. 7, 1995 [EP] European Pat. Off. .............. 95305494

[51] Int. Cl.[7] .................................................. H04L 12/28
[52] U.S. Cl. ........................................... 370/406; 370/410
[58] Field of Search .................................... 370/406, 410, 370/351, 216, 222, 227; 709/238; 714/4

[56] References Cited

U.S. PATENT DOCUMENTS

| | | |
|---|---|---|
| 4,956,835 | 9/1990 | Grover . |
| 5,065,399 | 11/1991 | Hasegawa et al. . |
| 5,146,452 | 9/1992 | Pakarske . |
| 5,435,003 | 7/1995 | Chng et al. ................................ 714/4 |
| 5,537,532 | 7/1996 | Chng et al. ................................ 714/4 |
| 6,026,073 | 2/2000 | Brown et al. ........................... 380/216 |

FOREIGN PATENT DOCUMENTS

| | | |
|---|---|---|
| 538853 | 4/1993 | European Pat. Off. . |
| 05 151292 | 9/1993 | Japan . |

*Primary Examiner*—Chi H. Pham
*Assistant Examiner*—Brenda H. Pham
*Attorney, Agent, or Firm*—Nixon & Vanderhye P.C.

[57] ABSTRACT

PURPOSE: To obtain a processing method capable of executing processing by a small memory and restricting the memory in accordance with the number of searching routes.

CONSTITUTION: Retrieving processing is started (10, 11) by using start point node as a start node, and in each end of processing, a node existing in a queue table 3 is used as a start node and the retrieving processing is repeated (12, 13). In retrieving processing (14, 15), the 1st processing is repeated by successively using the start node as a master node until there i no start node. The 1st processing (16) retrieves all slave nodes connected to the master node and the 2nd processing of the slave nodes is executed. If an item corresponding to a node in a data table 2 is in an idle state when the slave node is not an end point node in the 2nd processing (17 to 24), link information to the master node is recorded and the slave node is used as a start node, and when an idle state exists in the queue table in the recorded state of the link information, the identification (ID) information of the master node is recorded, and at the end point node, a route searching result is obtained from the link information stored in the data table 2.

9 Claims, 1 Drawing Sheet

ROUTE FINDING IN COMMUNICATION NETWORKS

BACKGROUND OF THE INVENTION

1. Field of the Invention

This invention relates to a method of finding, or determining, a route in a communication network; to a node arranged to perform the method; and to a network comprising such nodes. A route may be needed to replace an existing route which has failed, and such a route is referred to as a restoration route, or a route may be required to supplement an existing route which is becoming congested. As used herein, the term "additional route" embraces both restoration routes and supplementary routes.

2. Description of Related Art

It is known, for example from the article "The Self-Healing Network: A Fast Distributed Restoration Technique For Networks Using Digital Cross-Connect Machines", W. D. Grover, IEEE Globecom 87, and from U.S. Pat. No. 4,956,835 (Wayne D. Grover) to respond at the two nodes (known as failure nodes) connected to a failed span to receipt of a span failure alarm to initiate a real-time restoration process.

The failure nodes determine on the basis of their unique network identities (IDs) which node acts as Sender and which node acts as Chooser (also known as Master and Slave, respectively).

For each of the links of the failed span the Sender repeatedly transmits (floods) respective route-finder signatures to its neighbouring nodes (known as Tandem nodes) which forward flood the signatures to their neighbouring nodes. In one embodiment in the abovementioned U.S. patent a node knows only its own identity (ID) and learns the ID of the node to which connectivity has been lost by reading the last valid contents of a receive signature register on the affected port(s) corresponding to the failed link(s), and in an alternative embodiment, a node stores and maintains a neighbour node ID table.

The node which decides to act as Chooser now enters a waiting state and remains in it until it receives a route-finder signature. Then it responds by transmitting a respective complementary reverse-linking signature (also known as a confirmation or return signature) to the Tandem node from which the route-finder signature was received. The confirmation signature travels back through the Tandem nodes establishing the required switch connections between node input and output ports, and eventually arrives at the Sender node, which then ceases transmitting the respective route-finder signatures, and proceeds to transmit on that newly established restoration route the traffic which would have been transmitted on the corresponding link of the failed span.

The abovementioned U.S. patent also discloses that the restoration mechanism can be used for automatic provisioning of new circuit routes in a network by placing two nodes, between which it is desired to provision additional (i.e. supplementary) circuit routes, directly into Sender and Chooser states with regard to an artificial fault between the selected nodes. The nodes would be supplied with artificial fault information including the number of circuit routings that are being sought.

SUMMARY OF THE INVENTION

According to a first aspect of the present invention, there is provided a method of determining an additional route in a fully or partly meshed communications network of nodes, the method comprising the steps of:

determining, in response to a first predetermined circumstance and in accordance with a respective predetermined master/slave relationship, at each of a pair of the nodes between which there is an existing route, the one node of said pair which is to act as master end node with respect to said existing route and the other node which is to act as slave end node;

sending from said one node to its neighbouring nodes a forward route-finder signature for said existing route and including a first field containing identification data for said existing route;

receiving at a node a said forward route-finder signature, determining from the contents of said first field whether such receiving node is the slave end node for said existing route and, in the event that it is not, forwarding such received forward route-finder signature to its neighbouring nodes;

determining at said another node in response to a second predetermined circumstance a potential additional route and sending from said other node on said potential additional route a route confirmation signature identifying said potential additional route; and storing details of said potential restoration route at said one node upon receipt thereat of the route confirmation signature;

and the method being characterised by the steps of:

detecting at a node that a common circumstance has occurred in respect of a plurality of existing routes associated with said detecting node; and generating at said detecting node a common signature corresponding to said common circumstance, said common signature comprising respective first fields containing respective identification data for said plurality of existing routes, and a second field containing the number of said first fields.

The present invention is advantageous in situations where a node would otherwise generate individual signatures for each of a plurality of similar circumstances, for example, where an excavator cuts through a duct carrying one or more spans and a failure node has no permitted bypass restoration to the other failure node or nodes for a plurality of failed routes. The use of a common signature reduces the overall amount of signature processing time that receiving nodes take. Instead of having to deal with the protocol headers and trailers for each of a succession of individual signatures, a node need perform such processing only once for a corresponding common signature. This reduction in processing time is very significant for a restoration situation in a large network where a span failure could result in a large number of failed routes, and where otherwise a corresponding large number of help and route-finder signatures would be generated.

Preferably, said detecting node is a tandem node for each of said plurality of existing routes, and said common circumstance is the unavailability of respective bypass routes for said plurality of existing routes between said detecting node and an associated neighbouring node or nodes whereby said common signature is a help signature for breaking down connections in the respective nodes of said plurality of existing routes and for initiating a restoration process at the respective end nodes of said plurality of existing routes, and wherein said common signature is sent from said detecting node to each neighbouring node which is associated with one or more of said plurality of existing routes and with whom said detecting node has operational links.

Preferably, said detecting node is constituted by said one node, said common circumstance is said one node is, in addition to acting as master end node for said existing route, also acting as master end node with respect to one or more other existing routes whereby the common signature is a route-finder signature.

Preferably, the common signature is sent to all the neighbouring nodes of said one node.

According to a second aspect of the present invention, there is provided a node for use in a fully or partly meshed communications network of nodes, the node being arranged:

to respond, in use, to a first predetermined circumstance with respect to an existing route for which it is an end route to determine whether it will act as master end node or slave end node;

to send, in use, to its neighbouring nodes, in response to a determination that it will act as master end node, a forward route-finder signature;

to receive, in use, a route-finder signature and to determine whether or not it is an end node for the existing route identified by the route-finder signature, and, in response to a determination that it is not such an end node, to forward such received route-finder signature to its neighbouring nodes, or, in response to a determination that it is such an end node and subsequent to a preceding determination that the node is the slave end node for the existing route, to determine, in response to a second predetermined circumstance, a potential additional route, and to send on said potential additional route a route confirmation identifying the existing route; and to store, in use, details of a said potential additional route upon receipt thereat of a route confirmation signature for an existing route for which it is acting as master end node;

and characterised in that it is arranged:

to detect, in use, the occurrence of a common circumstance in respect of a plurality of existing routes associated therewith; and to generate a common signature corresponding to said common circumstance, said common signature comprising respective first fields containing respective identification data for said plurality of existing routes, and a second field containing the number of said first fields.

Preferably, the node is arranged to detect, in use and when it is a tandem node for each of said plurality of existing routes, the unavailability of respective bypass routes for said plurality of existing routes between itself and an associated neighbouring node or nodes, said unavailability constituting said common circumstance; to generate said common signature as a help signature for breaking down connections in the respective nodes of said plurality of existing routes and for initiating a restoration process at respective end nodes of said plurality of existing routes; and to send said common signature to each neighbouring node which is associated with one or more of said plurality of existing routes and with whom the node has operational links.

Preferably, the node is arranged such that, upon a determination that, in addition to acting as master end node for said existing route, it is also to act as master end node with respect to one or more other existing routes, it generates the common signature as a route-finder signature, said determination constituting said common circumstance.

Preferably, the node is arranged to send, in use, the common signature to all its neighbouring nodes.

According to a third aspect of the present invention, there is provided a fully or partly meshed communications network of nodes, wherein the nodes are substantially identical and in accordance with the second aspect of the present invention.

BRIEF DESCRIPTION OF THE DRAWINGS

A specific embodiment of the present invention will now be described by way of example with reference to the drawing in which.

DETAILED DESCRIPTION OF EXEMPLARY EMBODIMENTS

Figure 1:
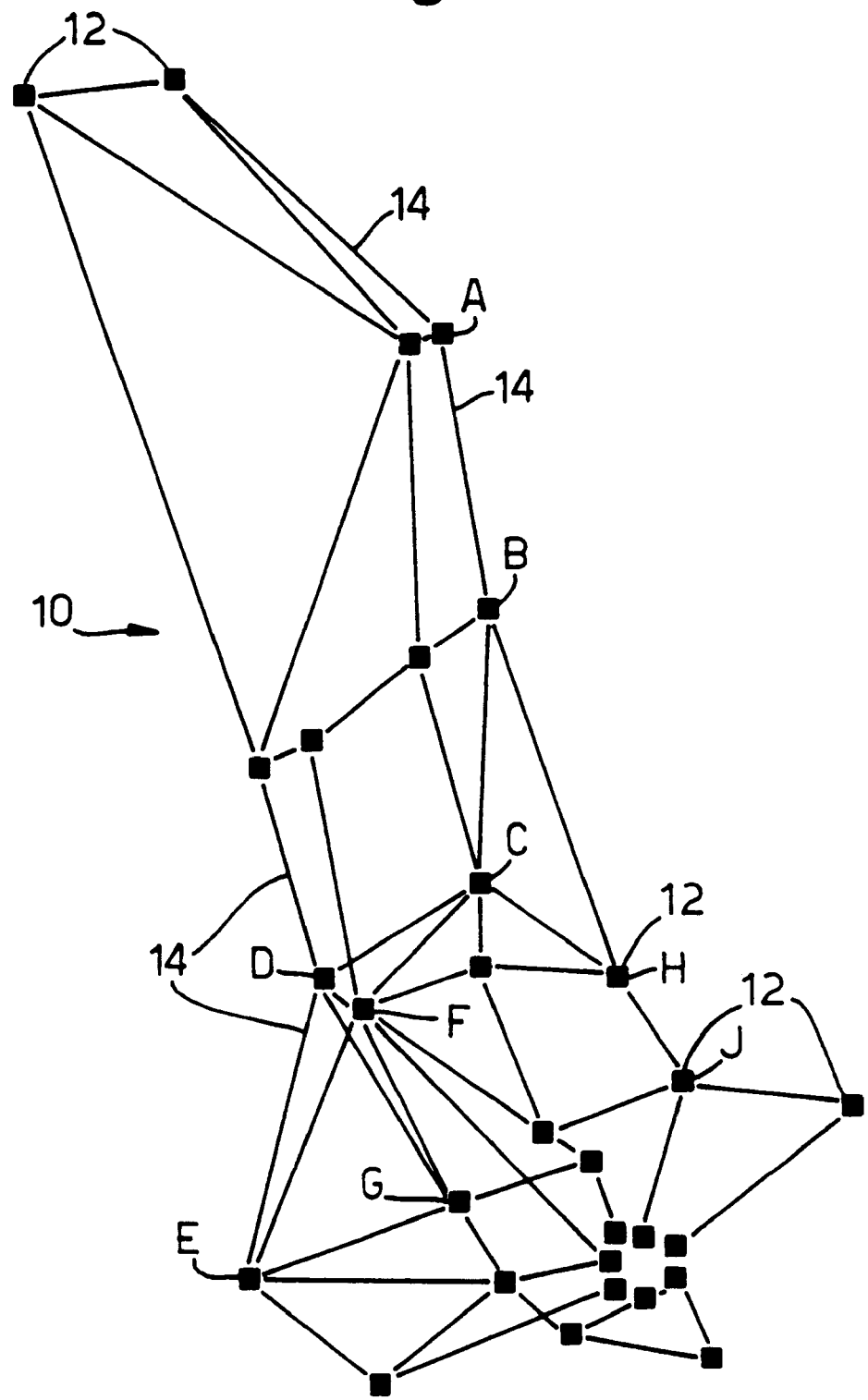
FIGURE 1 is a diagram of a network of interconnected nodes.

The specific embodiment of the present invention relates to a real-time restoration process for establishing a restoration route in a communications network and the following description will be limited to this although it will be appreciated that such a process need not be the sole restoration process in a network but can be combined with a pre-planned restoration process.

In FIGURE 1 there is shown a network 10 consisting of a number of nodes each having a unique network identity, but for the purposes of this description, only nodes A to J will be referred to. To avoid possible confusion the reference letter "I" is not used.

Of the many routes in the network 10 between respective pairs of end nodes, this description will consider only three routes having unique route IDs "X", "Y", and "Z". Route X is between end nodes A and E, passing through intermediate (also known as tandem) nodes B, C and D, and comprising a sequence of bidirectional links within spans AB, BC, CD, and DE; route Y is between end nodes A and G, passing through intermediate nodes B, C and F and comprising a sequence of bidirectional links within spans AB, BC, CF, and FG; and route Z is between end nodes D and J, passing through intermediate nodes C, and H and comprising a sequence of bidirectional links within spans DC, CH, and HJ. It will be appreciated that a span is named from the two nodes that it connects, and that, e.g., span CD can also be called span DC, and that the span name used in any instance will be consistent with the corresponding sequence of node reference letters from end node to end node for a route. In practice, node IDs and route IDs will be numeric, but in this desscription they are alphabetic for convenience.

The spans between the nodes comprise working links and spare links, and each working link is part of a respective unique route. Route capacity is expressed in terms of numbers of circuits, but capacity is added, or subtracted, in link units.

Consider that an excavator has severed a duct close to node C and containing at that point both span CD and span CF. In this case, the nodes C and D, i.e. the failure nodes for route X, upon detecting the failure of span CD, decide that a restoration route is to be found between nodes A and E, and similarly nodes C and F decide that a restoration route is to be found between nodes A and G, and nodes D and C decide that a restoration route is to be found between nodes D and J.

For ease of explanation it will be assumed that no other routes have failed, although it will be understood that, in practice, the failure nodes will, correspondingly, act to find a respective restoration route for each of any other routes which have experienced a failed link. The order in which these restoration routes are established may be predetermined by ranking the routes in priority order, but such ranking is not part of the present invention and will not be described.

Each failure node will, as the result of the abovementioned decision, now generate a common help signature (referred to herein as a help message) for its associated failed routes, and send the common help message to the respective end nodes of the routes.

Thus, node C will send its common help message for routes X, Y and Z to nodes B and H, because those are the neighbouring nodes for these routes, node F will send its common help message for route Y to node G, and node D will send its common help message for route X to node E. It will be appreciated that although node D is a failure node for route Z it is also an end node for that route.

Each of the various signatures used in the restoration process has a header and a trailer, the header including a four bit signature type field. The various types, as will be described in more detail later, are normal common route-finder (also referred to as forward common route-finder), reverse common route-finder (also known as backward common route-finder), route-tracer, alarm, common help, backtrack, and return (also known as confirmation).

The information section of a common route-finder signature comprises a four bit flood count field, a four bit hop count field, a four bit route ID count field, one or more sixteen bit route ID fields, and a corresponding number of eight bit circuit number fields.

The information section of a common help signature comprises a four bit route ID count field, one or more sixteen bit route ID fields, and a corresponding number of eight bit circuit number fields, so in the case of the signature sent from node C to nodes B and H, its ID count field contains the number three, the three ID fields contain, respectively, X, Y and Z, and the three associated circuit number fields contain the respective capacities of these routes.

As the common help messages pass through their respective intermediate nodes they break down connections in the corresponding failed route. Each node will forward a received common help message on the link or links which correspond to the route ID or IDs contained in the common help message.

Each node knows its own network ID and contains a table storing the route IDs for which it is an end node, and the network IDs of the other end nodes.

When node B receives the common help message, it will check its stored table to find out whether it is an end node for any of the identified routes, and where, as in this case, it is not an end node for route X or for route Y, it will transmit the common help message on the outgoing links associated with those routes (links of the span BA), and break down the connections for those routes by removing the route and link data from its connection table. Node H similarly forwards the common help message to node J.

When node A receives the common help message, it will determine that it is an end node for the routes X and Y, and proceed to determine whether it is higher-ranking or lower-ranking relative to the stored IDs of the other end nodes, i.e. E for route X and G for route Y, based on the unique network IDs (ordinal numbers) of the nodes. If the former, then it will act as a master node (also known as a sender node), and if the latter then it will act as a slave node (also known as a chooser node). In this example node A has a higher-ranking network ID than both node E and node G, and thus on receipt of the common help message will, for establishing a restoration route for routes X and Y, assume the role of master.

Similarly, when node E receives the respective common help message, it will determine that it is an end node for the route X, and proceed to determine whether it is higher-ranking or lower-ranking relative to the stored ID of the other end node (A) for route X. In this example node E has a lower-ranking network ID than node A, and thus on receipt of the common help message will, for establishing a restoration route for route X, assume the role of slave.

Node A now broadcasts a common forward route-finder signature for the failed routes X and Y, i.e. sends the signature on spare links to its neighbouring nodes. They in turn forward the received signature, which thus floods through the network. This signature contains the IDs of the routes X and Y, the respective requested capacities for the routes, the number two in its route ID count field, and has its flood count field set to one. As the signature floods through the network, the forwarding or relaying nodes (i.e. those nodes which are not end nodes for any route ID in the signature) increment the hop count field.

The relaying nodes forward the common signature on all spans and no check is made to see whether the spare capacity on a span is sufficient for the total capacity of a failed route, and the nodes do not mark that capacity as reserved.

The relaying nodes check the hop count of a received signature and take no action if the count is greater than a predetermined maximum. This sets a limit to the geographical extent of flooding. In variants, flooding control additionally or alternatively comprises checking a time of origin field in the signature and taking no action if the signature is older than a predetermined limit.

The master node A, when it has broadcast the common route-finder signature, will enter a quiescent state to await receipt of respective return signatures.

Upon node E determining that it is to act as slave for the failed route X, it starts (triggers) a timeout to await receipt of a corresponding route-finder signature containing the route ID X and thus indicating a potential restoration route of unknown capacity.

On the first receipt of such a forward route-finder signature within the timeout, the slave node E generates a return signature (also called a route confirmation signature) and sends it back via the node from which the forward route-finder signature was received. This return signature is similar to the route-finder signature, but differs in that the content of the signature type field is changed to identify the signature as a return signature travelling towards the master node A, the route ID count field is omitted, a single route ID field is used 20 containing the route ID X, and a single field is used for the requested capacity. The slave node E ignores any subsequently received route-finder signatures for the route X.

As the return signature passes through the nodes of the potential restoration route, each of these nodes checks what capacity is available, makes appropriate connections between the corresponding switch ports, and creates an eight bit node ID field, into which it writes its node ID. The node compares the requested capacity with the available capacity, and if the requested capacity is less than the available capacity it will make connections for the requested capacity and send the return signature to the next node of the potential restoration route. However, if the requested capacity is greater than the available capacity, the node will make connections for the available capacity and forward the signature with the number in the requested capacity field replaced by the available capacity, and also send to the slave end node E a backtrack signature containing the ID of route X and the value of the difference between the requested capacity and the available capacity to take down connections that have already been made for the capacity that cannot be established on that particular restoration route.

Upon receipt of the return signature, the master node A knows that a restoration route now exists, as identified by the intermediate or relaying node IDs in the signature, and the capacity of that particular restoration route, and now sends a route-tracer signature to node E, via the restoration route, to inform it of the intermediate nodes of the restoration route. Where the invention is used to find a supplementary route, the route-tracer signature can be sent on the existing route. This use of a route-tracer signature is known in the art and does not form part of the present invention.

The node A will know from the content of the circuit number field in the received return signature that the capacity of the restoration route is less than the requested value, and will switch to act as a slave node for route X for the deficiency and await receipt of a reverse route-finder signature for route X.

On receipt of the backtrack signature, the slave node E changes to act as a master node for route X, generates a route-finder signature with its flood count field set to two, and with the requested capacity in this signature set to the value in the backtrack signature (i.e. the circuit shortfall), and sends it to its neighbouring nodes. This signature is also referred to as a reverse route-finder signature. It will be appreciated that signatures with odd flood counts can be identified as successive attempts made by the original master to find a restoration route, and that signatures with even flood counts can be correspondingly identified as successive attempts made by the original slave.

The node A, now acting as a slave node, responds to first receipt of a reverse route-finder signature by immediately sending a return signature on the link on which the reverse route-finder signature was received. This signature has the appropriate code for a return signature in its signature type field, has its flood count field set to two, and also has its circuit number field set to the value in the received reverse route-finder signature.

The node E, acting as a master and having sent out reverse route-finder signatures, will now be in a waiting state.

The abovedescribed method of finding a restoration route in a network can be used to find a supplementary route by sending instructions from a network control centre to the two end nodes of a congested route so that they treat the congested route as failed and initiate the method of the invention to find an additional route (also known as an alternative route) between the two end nodes.

An advantage of the abovedescribed embodiment is that the number of separate signatures that a tandem node has to handle is reduced as compared with arrangements which use individual signatures for each affected route, so not only is there a reduction in the number of signatures that are received and queued waiting for the node processor to become free and deal with longest waiting signature, but also the total amount of processing required for a restoration situation is reduced because there are fewer headers and trailers. The route ID Y in the abovedescribed common help message from node C will pass through tandem node B at substantially the same time as the route ID X, instead of being contained in its own respective signature and being processed separately, possibly being delayed with respect to the siganture for route ID X. The finding of a restoration or supplementary route by this method is thus quicker than with previous methods using invidual respective signatures.

What is claimed is:

1. A method of determining an additional route in a fully or partly meshed communications network of nodes, the method comprising the steps of:

determining, in response to a first predetermined circumstance and in accordance with a respective predetermined master/slave relationship, at each of a pair of the nodes between which there is an existing route, the one node of said pair which is to act as master end node with respect to said existing route and the other node which is to act as slave end node;

sending from said one node to its neighbouring nodes a forward route-finder signature for said existing route and including a first field containing identification data for said existing route;

receiving at a node a said forward route-finder signature, determining from the contents of said first field whether such receiving node is the slave end node for said existing route and, in the event that it is not, forwarding such received forward route-finder signature to its neighbouring nodes;

determining at said another node in response to a second predetermined circumstance a potential additional route and sending from said other node on said potential additional route a route confirmation signature identifying said potential additional route; and storing details of said potential restoration route at said one node upon receipt thereat of the route confirmation signature;

and the method being characterised by the steps of :detecting at a node that a common circumstance has occurred in respect of a plurality of existing routes associated with said detecting node; and generating at said detecting node a common signature corresponding to said common circumstance, said common signature comprising respective first fields containing respective identification data for said plurality of existing routes, and a second field containing the number of said first fields.

2. A method as claimed in claim 1, wherein said detecting node is a tandem node for each of said plurality of existing routes, and said common circumstance is the unavailability of respective bypass routes for said plurality of existing routes between said detecting node and an associated neighbouring node or nodes whereby said common signature is a common help signature for breaking down connections in the respective nodes of said plurality of existing routes and for initiating a restoration process at the respective end nodes of said plurality of existing routes, and wherein said common signature is sent from said detecting node to each neighbouring node which is associated with one or more of said plurality of existing routes and with whom said detecting node has operational links.

3. A method as claimed in claim 1, wherein said detecting node is constituted by said one node, said common circumstance is said one node is, in addition to acting as master end node for said existing route, also acting as master end node with respect to one or more other existing routes whereby the common signature is a route-finder signature.

4. A method as claimed in claim 3, wherein the common signature is sent to all the neighbouring nodes of said one node.

5. A node for use in a fully or partly meshed communications network of nodes, the node being arranged:

to respond, in use, to a first predetermined circumstance with respect to an existing route for which it is an end route to determine whether it will act as master end node or slave end node;

to send, in use, to its neighbouring nodes, in response to a determination that it will act as master end node, a forward route-finder signature;

to receive, in use, a route-finder signature and to determine whether or not it is an end node for the existing route identified by the route-finder signature, and, in response to a determination that it is not such an end node, to forward such received route-finder signature to its neighbouring nodes, or, in response to a determination that it is such an end node and subsequent to a preceding determination that the node is the slave end node for the existing route, to determine, in response to a second predetermined circumstance, a potential additional route, and to send on said potential additional route a route confirmation identifying the existing route; and to store, in use, details of a said potential additional route upon receipt thereat of a route confirmation signature for an existing route for which it is acting as master end node;

and characterised in that it is arranged:

to detect, in use, the occurrence of a common circumstance in respect of a plurality of existing routes associated therewith; and to generate a common signature corresponding to said common circumstance, said common signature comprising respective first fields containing respective identification data for said plurality of existing routes, and a second field containing the number of said first fields.

6. A node as claimed in claim 5, and arranged to detect, in use and when it is a tandem node for each of said plurality of existing routes, the unavailability of respective bypass routes for said plurality of existing routes between itself and an associated neighbouring node or nodes, said unavailability constituting said common circumstance; to generate said common signature as a help signature for breaking down connections in the respective nodes of said plurality of existing routes and for initiating a restoration process at respective end nodes of said plurality of existing routes; and to send said common signature to each neighbouring node which is associated with one or more of said plurality of existing routes and with whom the node has operational links.

7. A node as claimed in claim 5, and arranged such that, upon a determination that, in addition to acting as master end node for said existing route, it is also to act as master end node with respect to one or more other existing routes, it generates the common signature as a route-finder signature, said determination constituting said common circumstance.

8. A node as claimed in claim 7, and arranged to send, in use, the common signature to all its neighbouring nodes.

9. A fully or partly meshed communications network of nodes, comprising nodes as claimed in claim 5, wherein the nodes are substantially identical.

* * * * *